United States Patent [19]

Takayama et al.

[11] Patent Number: 4,535,680
[45] Date of Patent: Aug. 20, 1985

[54] PNEUMATIC SERVO BOOSTER

[75] Inventors: Toshio Takayama, Kanagawa; Hiromi Ando, Tokyo; Mitsuhiro Endou, Kanagawa, all of Japan

[73] Assignee: Tokico Ltd., Kanagawa, Japan

[21] Appl. No.: 566,385

[22] Filed: Dec. 28, 1983

[30] Foreign Application Priority Data

Jan. 10, 1983 [JP] Japan ..................................... 58-1906

[51] Int. Cl.³ .............................................. F15B 9/10
[52] U.S. Cl. .............................. 91/376 R; 91/369 A; 181/230
[58] Field of Search ............. 91/369 A, 369 B, 369 R, 91/376 R; 181/212, 230

[56] References Cited

U.S. PATENT DOCUMENTS

| 4,022,112 | 5/1977 | Putt et al. | 91/369 A |
| 4,117,769 | 10/1978 | Carre et al. | 91/369 A |
| 4,212,370 | 7/1980 | Dreher et al. | 181/230 |
| 4,274,258 | 6/1981 | Shirai et al. | 91/369 A |

FOREIGN PATENT DOCUMENTS

| 2706044 | 7/1978 | Fed. Rep. of Germany | 181/230 |
| 1120850 | 4/1956 | France | 181/212 |

Primary Examiner—Paul E. Maslousky
Attorney, Agent, or Firm—Wenderoth, Lind & Ponack

[57] ABSTRACT

A pneumatic servo booster including a housing, a power piston unit partitioning the interior of the housing into front and rear chambers and having therein a first passage with one end opening to the front chamber and the other end opening to the interior of the power piston unit and a second passage with one end opening to the rear chamber and the other end opening to the interior of the power piston unit, and a valve mechanism provided in the interior of the power piston unit and being associated with an input rod to control the communication between first and second passages and between the second passage and another passage which is communicated with a source of a first reference pressure. A plurality of diversion channels are provided in at least one of the first and second passages to decrease the speed of the air flow in the passage and to rectify the air flow thereby suppressing noise.

5 Claims, 11 Drawing Figures

PNEUMATIC SERVO BOOSTER

BACKGROUND OF THE INVENTION

This invention relates to a pneumatic servo booster adapted for use in a hydraulic braking system of a vehicle.

Typical prior art pneumatic servo booster comprises a housing, a power piston unit partitioning the interior of the housing into front and rear chambers and having therein first and second passages, first ends of which opening respectively to front and rear chambers and second ends of which opening respectively to the interior of the power piston unit, a valve mechanism provided in the interior of the power piston unit and being associated with an input rod to control the communication between the first and second passages and the communication between the second passage and a source of a first reference pressure. The front chamber is connected to a source of a second reference pressure which is lower than the first reference pressure. The second reference pressure is a vacuum pressure, in one example, which is generated in an intake manifold of an engine and the first reference pressure may be the atmospheric pressure.

In actuating the input rod the communication between the first and second passages is cut off and the second passage is communicated with the source of the first reference pressure, whereby the first reference pressure is introduced into the rear chamber to produce a pressure difference between the rear and front chambers and the differential pressure acting on the power piston unit is taken out through an output rod. In releasing the input force applied on the input rod, the communication between the first reference pressure source and the second passage is cut off and, the second passage is communicated with the first passage whereby the relatively high pressure air in the rear chamber flows into the front chamber until the pressure in the rear chamber decreases to the second reference pressure.

In such prior art pneumatic servo booster, there are the shortcomings that in actuating the servo booster air under the first reference pressure rapidly flows through the second passage into the rear chamber with noise being generated and that in releasing the servo booster the air confined in the rear chamber rapidly flows through the second and first passages into the front chamber with noise being generated. Particularly, when the booster is mounted in a driver's compartment of a vehicle, it has been strongly required to reduce such noise.

SUMMARY OF THE INVENTION

The present invention aims to satisfy such requirements and, according to the invention, a plurality of diversion channels are provided in either one of the first and second passages. Preferably, the diversion channels are provided at a location adjacent to the outlet end of the first or the second passage opening to the related pressure chamber.

BRIEF DESCRIPTION OF THE DRAWINGS

Further objects and advantages of the invention will become apparent from the following description taken with reference to the accompanying drawings which exemplify preferred embodiments of the invention, and in which.

DESCRIPTION OF THE PREFERRED EMBODIMENTS

Figure 1:
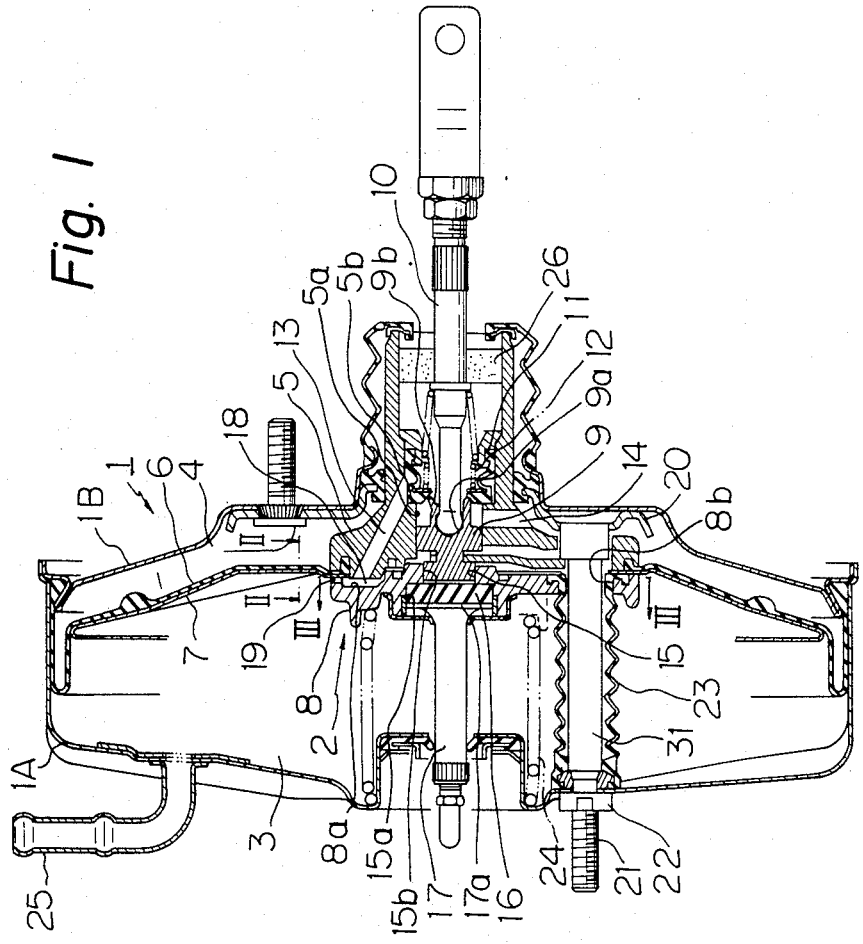
FIG. 1 is a longitudinal sectional view of a first embodiment of the invention with the upper half thereof being a vertical cross-section and the lower half being a horizontal cross-section.
Figure 2:
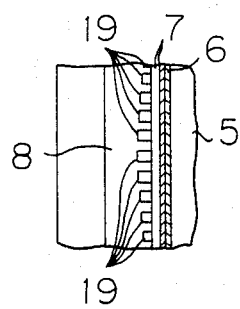
FIG. 2 is a partial view as viewed along line II—II in FIG. 1.
Figure 3:
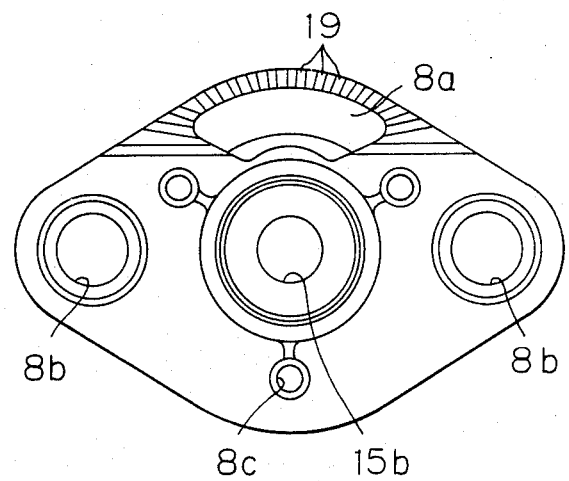
FIG. 3 is an end view of a disc holder in FIG. 1 as viewed along line III—III in FIG. 1.

The pneumatic servo booster shown in FIG. 1–FIG. 3 comprises a housing 1 consisting of a front shell 1A and rear shell 1B, and a power piston unit 2 partitioning the interior of the housing 1 into a front chamber 3 and a rear chamber 4. The power piston unit 2 is generally constituted of a valve body 5, a diaphragm 6, a piston plate 7 and a disc holder or cover member 8. The valve body 5 has a generally cylindrical form and extends through the rear shell 1B rearwards to the outside of the booster and is sealingly slidable relative to the rear shell 1B in the left and right ward directions as viewed in FIG. 1 (which are referred as front and rearward directions respectively). A cylinder bore 5a is formed in the valve body 5 to receive slidably a plunger 9, and a spherical end of an input rod 10 is fitted in a recess 9a which is formed in the rear surface of the plunger 9. The rear end of the input rod 10 is connected to such as a brake pedal (not shown) of a vehicle. There are formed respectively on the rear ends of the cylinder bore 5a of the valve body 5 and the plunger 9 concentrical valve seats 5b and 9b, and a poppet valve 11 is provided in the valve body 5 and rearwards of the valve seats 5b and 9b. The poppet valve 11 is urged towards the valve seats 5b and 9b by a spring 12. A first passage 13 and a second passage 14 are formed in the valve body 5. One end of the first passage 13 opens to the front chamber 3 and the other end of the passage 13 opens in the inner surface of the valve body 5 at a position rearwards of the valve seat 5b and frontwards of the base portion of the poppet valve 11 which is mounted in the valve body 5. One end of the second passage 14 opens to the rear chamber 4 and the other end of the passage 14 opens in the inner surface of the valve body 5 at a position frontwards of the valve seat 5b. The first passage 13 has a generally uniform cross-sectional area in the lengthwise direction.

In the unactuated condition of the servo booster, the poppet valve 11 abuts with valve seats 9b and 5b, the communication between front and rear chambers 3 and 4 is intercepted and further, the communication between the rear chamber and the atmosphere is also intercepted. The interior of the valve body 5 and around the input rod 10 is communicated with the atmosphere through an air filter 26, and the atmosphere acts as a source of a first reference pressure according to the invention. Incidentally, the front chamber 3 is communicated through an air pipe 25 with a source of vacuum pressure such as an intake manifold (not shown) of an engine so that the front chamber 3 is normally maintained at a predetermined vacuum pressure which is referred as a second reference pressure according to the invention.

When the poppet valve 11 separates from the valve seat 9b with the valve seat 5b contacting with the poppet valve, atmospheric air is introduced into the rear chamber 4, and when the poppet valve 11 separates from the valve seat 5b and abuts with the valve seat 9b the communication between the rear chamber 4 and the atmosphere is intercepted and the rear chamber is communicated with the front chamber 3.

The disc holder 8 is secured on the front surface of the valve body 5 interposing therebetween the diaphragm 6 and the piston plate 7. A through bore 15 is formed in the disc holder 8 and includes a large diameter portion 15a and a small diameter portion 15b. The small diameter portion 15b receives slidably the front end portion of the plunger 9 and the large diameter portion 15a receives a resilient reaction disc 16 and a large diameter rear end portion 17a of an output rod 17. The output rod 17, the input rod 10, the plunger 9 and the valve body 5 are arranged coaxially.

According to the invention, the first passage 13 does not directly open to the front chamber 3, and a plurality of diversion channels 19 are formed in the disc holder 8 to communicate the first passage 13 with the front chamber 3. Namely, a generally fan-shaped recess 8a as seen in FIG. 3 is formed in the rear surface of the disc holder 8 so as to cover the opening of the passage 13, and to define a space 18 between the front surface of the valve body 5 and the rear surface of the disc holder 8. A plurality of radial cutouts are formed in the rear surface of the disc holder 8 and around the circumference of the recess to constitute aforesaid diversion channels 19. The configuration and the size of the diversion channels 19 may be determined as desired.

In a prior art servo booster, the first passage 13 is formed to have a cross-sectional area gradually increasing toward the front chamber 3 and, in releasing the servo booster, the air confined in the rear chamber 4 rapidly flows into the front chamber 3 through the annular clearance between the poppet valve 11 and the valve seat 5b and through the first passage 13. Noise is generated when the air passes through the clearance between the poppet valve 11 and the valve seat 5b and is amplified by the trumpet like configuration of the passage 13. According to the invention, the passage 13 has a constant cross-section as described heretofore, and the air flow is divided into a plurality of diverged flows with the velocity thereof being decreased, whereby noise is not amplified in the passage 13 and is reduced substantially. Incidentally, the cross-sectional area of the passage 13 and the total cross-sectional area of the diversion channels 19 should be determined based on a desired operational speed of the servo booster. In other words, when the cross-sectional area of the passage 13 is excessively reduced, the servo booster operates very slowly and noise will not be generated, but, usually, the cross-sectional area of the passage is sufficiently large that noise is generated.

As shown in FIG. 3, the disc holder 8 has two horizontally spaced openings 8b for passing therethrough reinforcing rods 31, which will be described hereinafter, and three circumferentially spaced openings 8c for passing therethrough retaining bolts which secure the disc holder on the valve body 5. A supporting plate 20 is provided on the inner wall of the rear shell 1B to clamp therebetween and support the rear end of the reinforcing rods 31 (only one of which is shown in FIG. 1). Each rod 31 extends through the power piston unit 2 and the front shell 1A so that the front end thereof extends to the outside of the housing 1 and, a nut 22 screw-threadingly engages with screw threads 21 formed on the front end of the rod 31. A bellows 23 extends between the inner wall of the front shell 1A and the power piston unit 2 and surrounds the rod 31 and, the rear end of the bellows 23 opens to the rear chamber 4. A return spring 24 is disposed between the power piston unit 2 and the inner wall of the front shell 1A.

In operation, when the brake pedal is depressed a forward thrust force is applied on the input rod 10, and the plunger 9 moves forward together with the input rod 10. The valve seat 9b of the plunger 9 separates from the poppet valve 11 whereby the atmospheric air is introduced into the rear chamber 4 and a differential pressure acts across the power piston unit 2 which is transmitted to the output rod 2 through the reaction disc 16. The reaction disc 16 transmits a reaction force to the input rod 10. The output rod 17 is connected to such as a master cylinder to generate a hydraulic pressure which is transmitted to wheel brakes. The forward movement of the power piston unit 2 stops when the valve seat 9b of the plunger 9 engages with the poppet valve 11 and the communication between the rear chamber 4 and the atmosphere is intercepted and, the servo booster takes an equilibrium condition which is determined by the input force applied on the input rod 10. When the brake pedal is further depressed the power piston unit further moves forward.

When the depressing force applied on the brake pedal is released, the reaction force from the output rod 17 moves rearward the plunger 9, and the poppet valve 11 separates from the valve seat 5b on the valve body 5, whereby the rear chamber 4 is communicated with the front chamber 3 and the pressure in the rear chamber 4 decreases. Finally, the power piston unit 2 returns to the position shown in FIG. 1 due to the return spring 24. The air flowing from the rear chamber 4 to the front chamber 3 through the first passage 13 forcibly passes through diversion channels 19 whereat the flow speed decreases and the flow is rectified, and the noise due to the air flow can remarkably be reduced. In this embodiment, the recess 8a and the space 18 are also effective in restricting pulsation in the air flow and reducing noise.

Now, description will be made with respect to other embodiments wherein parts corresponding to the first embodiment are depicted by the same reference numerals and the detailed explanation therefor is omitted.

Figure 4:
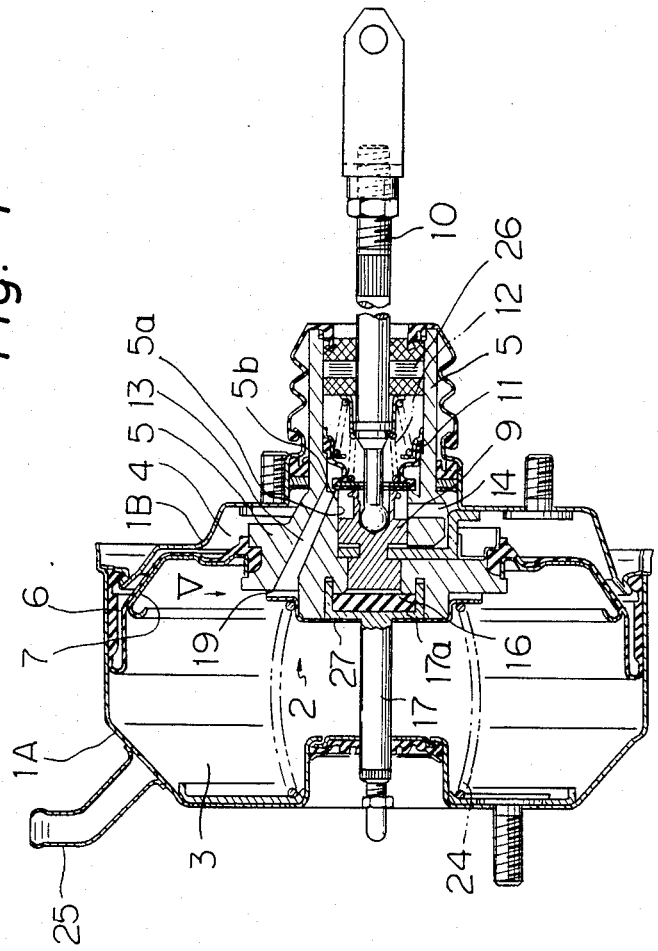
FIG. 4 is a longitudinal sectional view of a second embodiment of the invention.
Figure 5:
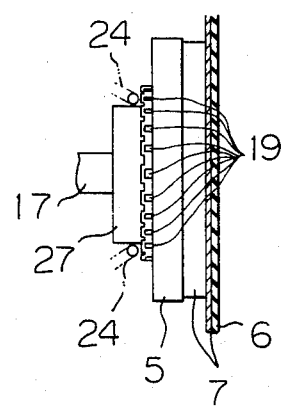
FIG. 5 is a partial view as viewed in direction V in FIG. 4.

FIGS. 4 and 5 show the second embodiment of the invention wherein a holder or cover member 27 is fitted on the front surface of the valve body 5 to retain a large diameter rear end portion 17a of the output rod 17 in the front end of the valve body 5 and to act as a spring seat for the return spring 24. A plurality of small communicating holes acting as diversion channels 19 according to the invention are formed along the outer circumference of the holder 27 and are communicated with the first passage 13. The holder 27 is advantageously formed of such as sheet metal or the like and the diversion channels may be formed by pressing operation on holer 27, which simplifies the fabricating process.

Figure 6:
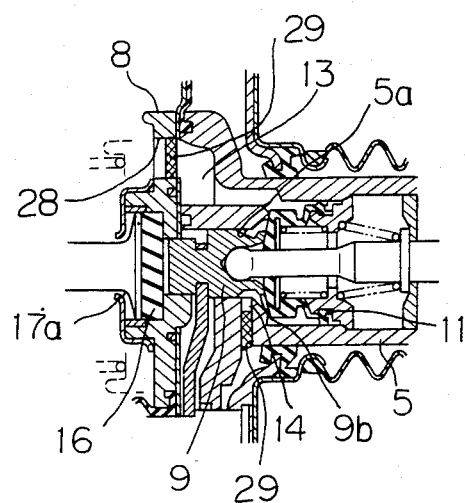
FIG. 6 is a partial sectional view of a third embodiment of the invention.

FIG. 6 shows the third embodiment, wherein the first passage 13 in the valve body 5 is connected with a through hole 28 formed in the disc holder 8 and a porous filter member 29 such as a sponge or the like is fitted in the hole 28. The filter member 29 defines therein a plurality of diversion channels which are effective in retarding the speed of the air flow and rectifying the flow thereby suppressing noise. Similar filter member 29 is also mounted in the second passage 14 at the location adjacent to the rear chamber 4. The filter member 29 mounted in the second passage 14 is effective to reduce noise in actuating the servo booster and the filter member 29 mounted in the hole 28 acts to reduce noise in releasing the servo booster.

Figure 7:
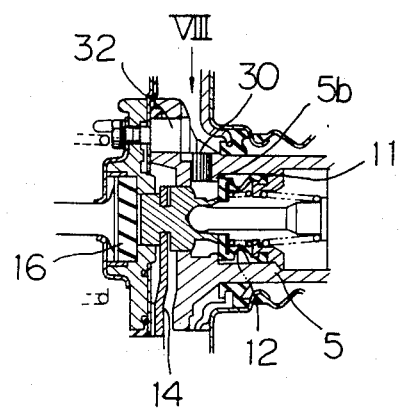
FIG. 7 is a partial sectional view of a fourth embodiment of the invention.
Figure 8:
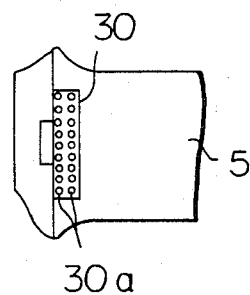
FIG. 8 is a partial view as viewed in direction VIII in FIG. 7.
Figure 9:
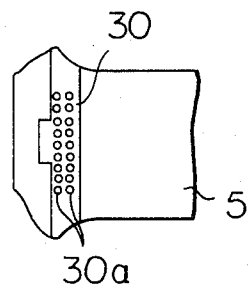
FIG. 9 shows a modified form of FIG. 8.
Figure 10:
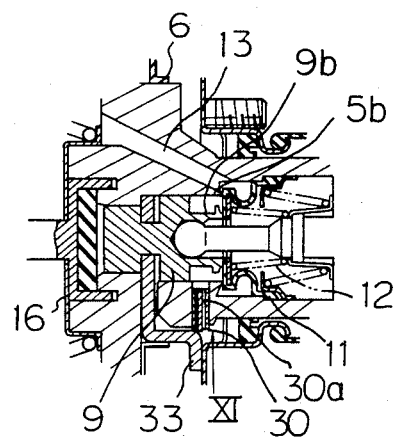
FIG. 10 is a partial sectional view of a fifth embodiment of the invention.
Figure 11:
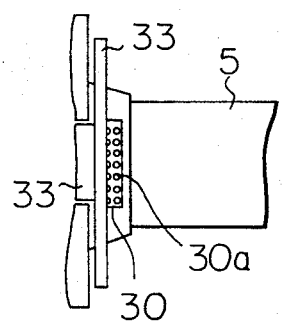
FIG. 11 is a partial view as viewed in direction XI in FIG. 10.

FIG. 7–FIG. 11 show the fourth embodiment, wherein a block 30 having a plurality of small openings 30a as shown in FIG. 8 is mounted in the second passage 14. The block 30 is retained in its position by the head of a retaining bolt 32 which connects the disc holder 8 with the valve body 5 as shown in FIG. 7, and, in a modified form shown in FIGS. 10 and 11, by a return movement restricting member 33 which is mounted on the valve body 5 and is adapted to abut with the inner wall of the rear shell 1B thereby determining the return position of the valve body 5 with respect to the housing 1.

In actuating the servo booster, the atmospheric air enters into the rear chamber 4 through the small openings 30a in the block 30 which can effectively decrease the velocity of the air flow and rectify the air flow and, noise caused of the air flow can effectively be suppressed. The noise suppressing mechanism is similar to the aforesaid description relating to the diversion channels 19 in the first embodiment. The cross sectional area of the second passage 14 is usually sufficiently (at least two or three times) large as compared with the minimum area for assuring the desired operational speed of the servo booster, so that even if the block 30 extends along the entire length of the passage 14 the operational speed of the servo booster would not decrease. Thus, according to the embodiment shown in FIG. 7–FIG. 11, it is possible to effectively reduce noise of the air flow both in actuating and releasing the servo booster. In a further modified form shown in FIG. 9, the plurality of small openings 30a are formed integrally in the valve body 5. Further, the block 30 may be mounted in the first passage 13 to further decrease sounds. It will be understood that FIG. 7 does not show the first passage 13, but the first passage 13 is also provided in the valve body 5.

Although the description has been made with respect to embodiments wherein the front chamber is maintained at a vacuum pressure and the rear chamber is communicated with the atmospheric pressure in actuating the servo booster, the invention is not limited to these embodiments and the relationship between the front and rear chambers may be vacuum pressure and high pressure or the atmospheric pressure and high pressure.

As described heretofore, according to the invention, a plurality of diversion channels are provided in either of the first and second passages, the velocity of the air flowing through the diversion channels is effectively reduced, the air flow is rectified, thus, noise due to the air flow can be reduced.

What is claimed is:

1. In a pneumatic servo booster of the type including a housing, a power piston unit partitioning the interior of said housing into front and rear chambers and having therein a generally longitudinally extending first passage having a first end communicated with said front chamber and a second end communicated with the interior of said power piston unit, and a generally radially extending second passage having a first end communicated with said rear chamber and a second end communicated with said interior of said power piston unit, a valve mechanism provided in said interior of the power piston unit and being associated with an input rod to control the communication between said first and second passages and between said second passage and another passage which is communicated with a source of a first reference pressure, said front chamber being communicated with a source of a second reference pressure which is lower than said first reference pressure, and an output rod connected to said power piston unit, the improvement wherein said power piston unit comprises:

a power piston main body;
a cover member secured to said power piston main body and covering said first end of said first passage; and
a plurality of diversion channel means, provided between adjacent surfaces of said cover member and said power piston main body and extending radially outwardly from the periphery of said first end of said first passage and through said cover member, for communicating said first passage with said front chamber and for reducing noise caused by fluid passing from said first passage into said front chamber.

2. The improvement claimed in claim 1, wherein said cover member has formed therein a fan-shaped recess into which opens said first end of said first passage, and said diversion channel means comprises cut-outs formed in said cover member and extending from said recess to said front chamber.

3. The improvement claimed in claim 1, wherein said cover member is formed of sheet metal, and said diversion channel means comprise recesses formed by a pressing operation in said cover member.

4. The improvement claimed in claim 1, wherein said diversion channel means diverge in the direction of fluid flow from said first passage to said front chamber.

5. The improvement claimed in claim 1, wherein the cross-sectional area of each said diversion channel means is constant between said first passage and said front chamber.

* * * * *